United States Patent Office 2,950,323
Patented Aug. 23, 1960

2,950,323

MERCAPTAN SYNTHESIS

Bernard Loev, Philadelphia, and John T. Massengale, West Chester, Pa., assignors to Pennsalt Chemicals Corporation, Philadelphia, Pa., a corporation of Pennsylvania No Drawing. Filed Apr. 10, 1958, Ser. No. 727,550

13 Claims. (Cl. 260—609)

This invention relates to a process for the preparation of mercaptans; and more particularly, to a process for the preparation of secondary and tertiary mercaptans by the reaction of hydrogen sulfide with alcohols.

Mercaptans, especially aliphatic mercaptans, are widely employed in industry, as gas odorants, in synthetic rubber manufacture and compounding, and for other purposes. The mercaptans which are used industrially are generally either primary or tertiary mercaptans; although secondary mercaptans are recognized to be of equal or greater utility, these mercaptans have been passed over in industrial development because they have been much more expensive to manufacture than the primary or tertiary compounds.

Primary mercaptans are manufactured commercially by reaction of a primary alcohol with hydrogen sulfide. Exploratory investigations of the preparation of mercaptans from secondary and tertiary alcohols, however, have given unpromising results, and this approach to secondary and tertiary mercaptan synthesis has accordingly received little attention up to the present.

When mercaptans other than primary mercaptans are required industrially, tertiary mercaptans are employed. Tertiary mercaptans are prepared technically by addition of hydrogen sulfide to branched-chain olefins. Synthesis of mercaptans from olefins has various disadvantages, including requirements for high pressure equipment, difficulties in obtaining pure olefin sources and the like.

Secondary mercaptans have not hitherto been available from either alcohols or olefins by a good commercial process. The preparation of secondary alkyl mercaptans by the catalyzed reaction of a secondary alcohol with hydrogen sulfide in the presence of thoria has been described in the literature; this process gives extremely low conversions and yields as compared to those obtained with primary alcohols. Syntheses of secondary mercaptans from olefins are also unsatisfactory. In a series of experiments on the preparation of isopropyl mercaptan from propylene by a catalyzed reaction with hydrogen sulfide over a variety of solid catalysts, the best yield reported to be obtained was only 30%, and furthermore, the reaction was found to be very slow and to give a mixture of products. Similarly, it has been reported that unfavorably low yields are obtained in the preparation of sec-butyl mercaptan by reaction of butene with hydrogen sulfide. Better conversions have been produced in a process employing a boron trifluoride catalyst, but this method suffers from the serious disadvantage of using a liquid catalyst which is corrosive and difficult to handle; furthermore, this process is excessively expensive because the liquid catalyst must be destroyed at the end of each run.

It is an object of this invention to provide an improved process for the preparation of secondary and tertiary mercaptans.

It is a particular object of this invention to provide an improved process for the preparation of secondary mercaptans.

It is a further object of this invention to provide a method for the preparation of secondary mercaptans by reaction of alcohols with hydrogen sulfide whereby improved conversions and yields are obtained.

Another object of this invention is to provide a process for the preparation of secondary and tertiary mercaptans from primary alcohols by the catalyzed reaction of such alcohols with hydrogen sulfide.

Another object of this invention is to provide a method for the preparation of secondary and tertiary mercaptans from secondary alcohols.

These and other objects will be come apparent from a consideration of the following specification and claims.

We have found that secondary and tertiary mercaptans may be obtained in high conversions and yields by reacting an alcohol containing the grouping

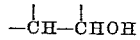

with hydrogen sulfide in the presence of a solid-form oxygen acid catalyst under conversion conditions of temperature and superatmospheric pressure. A secondary or tertiary mercaptan isomeric with the initial alcohol is obtained, according to one embodiment of this invention as further described below. Alternatively, from certain particular alkanols containing the grouping

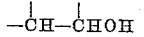

and of a configuration as defined hereinafter, the present process produces, in high conversions, mercaptans in which the position of the functional group is the same as that in the initial alcohol.

The present process represents an advantageous improvement in a variety of respects over prior art methods for the preparation of secondary and tertiary mercaptans. The alcohols employed as starting materials herein are usually easier to handle and more readily purified than olefins or other alternative potential starting materials. The present catalytic process is not limited to the preparation of mercaptans corresponding in structure to the initial alcohol. The pressures employed in this process are within the range readily attained in ordinary factory equipment; thus, special high pressure equipment such as has been required hitherto in various proposed mercaptan syntheses is not needed for the practice of the present method. The presently employed catalysts are solid-form materials which are conveniently handled, have a relatively long service life, and are well suited to use in a continuous manufacturing process. Furthermore, the activity of these catalysts, unlike that of certain prior art catalysts for mercaptan synthesis, is not markedly sensitive to variations in temperature or in the space velocity of the reactants. It is a particular feature of this invention that secondary mercaptans are produced by the present process in conversions of commercially practicable significance.

The process of our invention is unique in several respects. One such novel feature of this invention comprises the discovery that by the present process as defined hereinabove, an alcohol may be converted to an isomeric mercaptan, that is, a mercaptan in which the functional group, the thiol radical, is attached to a different carbon atom than that to which the hydroxy radical of the original alcohol had been attached. In prior art processes for the catalyzed conversion of an aliphatic alcohol to a mercaptan, the thiol radical simply replaces the hydroxy radical, so that a primary alcohol is converted to a primary mercaptan, a secondary alcohol to a secondary mercaptan, and so forth. This process may be illustrated with reference to normal-propanol by the following equation:

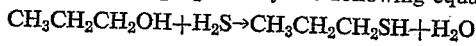

By contrast, in the process of our invention, when a primary alcohol is reacted with hydrogen sulfide, the thiol radical is introduced on the carbon atom alpha to the carbon atom originally substituted by a hydroxy radical, as illustrated by the following equation:

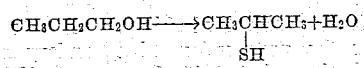

Either secondary or tertiary mercaptans are produced from primary alcohols by our process. The thiol radical goes on to the carbon atom alpha to the hydroxy-substituted carbon atom of the alcohol. If the alpha carbon atom is a methylidene radical, >CH—, the product is a tertiary mercaptan. If a methylene radical, —CH$_2$—, is in the alpha position, the product is a secondary mercaptan. This will be readily evident from the following equations:

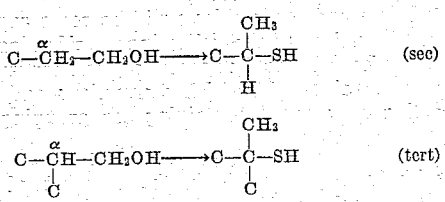

The common characteristic of the present secondary and tertiary mercaptan products is the presence of the grouping

in which the carbon atom to which the thiol radical is attached is bonded to a minimum of two other carbon atoms. The class of secondary and tertiary mercaptans, characterized by this configuration, will sometimes be referred to herein briefly as internally substituted mercaptans.

Either secondary or tertiary mercaptans are also produced from secondary alcohols by this process. Our process as applied to secondary alcohols has two unique and valuable features. On the one hand, production of tertiary mercaptans and of secondary mercaptans isomeric with the original alcohol as herein accomplished is believed to be a result never reported hitherto. On the other hand, our process as applied to certain aliphatic secondary alcohols does not necessarily result in formation of mercaptan products of divergent structure, but does lead to unprecedentedly high conversions to mercaptans.

Insofar as the process of the invention leads to unique and unexpected mercaptan products, the conversion involves removal of the hydroxy radical and introduction of the thiol radical on the alpha carbon atom, as explained above with reference to primary alcohols. In secondary alcohols, there are of course two alternative positions alpha to the carbinol carbon atom. Primary mercaptan formation does not occur in the present process, so that if one of the alpha positions is terminal, it is the other alpha position which is substituted by a thiol radical. When the alpha positions offer a choice between secondary and tertiary mercaptan formation, tertiary mercaptan formation is favored. Thus, from 2-methyl-3-butanol there will be obtained 2-methyl-2-butanethiol.

Certain secondary alcohols are of such a configuration that the positions in the molecule of the carbinol carbon atom and of any non-terminal carbon atom alpha to the carbinol carbon atom are equivalent. The symmetry of the molecule is such that shifting the substituent into any available non-terminal alpha position leads only to the production of a molecule with the same structure as was present initially. Alcohols which are of this nature include several of the more readily available secondary lower alkanols, such as isopropanol, wherein no non-terminal alpha carbon atom is present

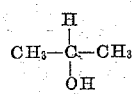

sec-butanol, wherein which of the two center carbon atoms of the butyl radical is substituted is immaterial

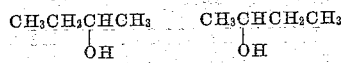

and cyclohexanol, wherein none of the ring carbon atoms is terminal, and all positions are equivalent

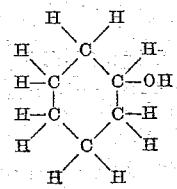

To the extent that the present process is applied to alcohols of the stated structure, the effective result of the process is to convert these alcohols to mercaptans of corresponding structure. When the alcohol contains an available alpha position, and a change of position may occur in replacement of the hydroxyl by the thiol radical, it is not detectable in the product, due to the symmetry of the molecule. When the process is applied to the lowest member of the presently considered series, isopropanol, isopropyl mercaptan is the product: here, both of the alpha positions are terminal and inasmuch as formation of a primary mercaptan, which terminal substitution would produce, does not occur in the present process, the only possible product necessarily corresponds in structure to the initial alcohol.

As regards this conversion of lower aliphatic alcohols to lower mercaptans of corresponding structure, wherein no evident shift in the substituted carbon atom occurs, our process is unique in that it yields secondary mercaptans in high conversions. It was established in the pioneering work of Sabatier on catalyzed conversion of alcohols to mercaptans, that whereas primary alcohols give relatively high conversions to mercaptans, the yields of mercaptan from secondary alcohols are substantially poorer; and indeed, only about ⅓ of those from primary alcohols. Our experiments have confirmed that by prior art methods, using catalysts such as ThO$_2$ and Al$_2$O$_3$, only very poor conversions of secondary alcohols to secondary mercaptans can be obtained. Furthermore, with the catalysts utilized herein, little or no mercaptan is obtained from secondary alcohols under Sabatier's conditions, at atmospheric pressure. However, we have made the discovery that with our preferred catalysts, an unexpectedly great increase in conversion is obtained when superatmospheric pressures are employed. The pressures required are of a surprisingly low order of magnitude for the effect produced: under the same conditions, the yield of mercaptan is only 1% at atmospheric pressure, but rises to 38%, an increase by a factor of almost 40, when a pressure of less than 10 atmospheres is employed. Inasmuch as the mechanism operating in mercaptan synthesis by the process of our invention appears to be different from that known hitherto, as is evident from comparison of the product derived from n-propanol by Sabatier's process and that derived by our process, we consider that our invention as applied to production of secondary mercaptans from secondary alcohols is also of a different nature than that known hitherto, and that the presently obtained excellent conversions are due to this fact.

In respect to mechanism, Sabatier has proposed intermediate formation of an ester of the alcohol with the catalyst, such as thorinate ester, from which the hydrogen sulfide displaces the thorium acid to form the mercaptan. This explains the correspondence in structure between the initial alcohol and the mercaptan obtained by Sabatier's process. In our process, the catalysts employed are much stronger acids than hydrogen sulfide, and such a mechanism, involving ester formation, is inadmissible. Furthermore, Sabatier's process, in which the thiol radical takes the position of the hydroxy radical, is also applicable to aromatic alcohols such as phenols. We find that in the process of our invention, it is necessary that the functional group be attached to an aliphatic radical, the presently useful alcohols containing the grouping

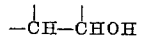

Accordingly, we hypothesize that the process of our invention involves conversion of the alcohol to an intermediate other than an ester; but we do not wish to be bound by any particular explanation of the present process.

The alcohols which may be employed in the practice of this invention comprise primary and secondary alcohols containing the grouping

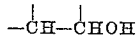

It will be evident that the alcohols to which the present process is applicable will contain at least 3 carbon atoms. Any of a wide variety of alcohols meeting the foregoing stipulations may be employed. In general, the alcohols of particular utility for conversion to mercaptans as described herein will be hydrocarbyl alcohols. Such alcohols may be represented by the formula $$R-\underset{\underset{R'}{|}}{C}H-\underset{\underset{R''}{|}}{C}HOH$$

where each of R, R' and R" is selected from hydrogen and hydrocarbon radicals free of aliphatic unsaturation. This invention particularly contemplates the use of alcohols of the foregoing formula where the total number of carbon atoms in R, R' and R" taken together will be from 1 to 16: in other words, the alcohols will contain from 3 to 18 carbon atoms. It will be understood that combinations of R, R' and R" may conjointly represent bivalent hydrocarbon radicals which, taken with the carbon atoms of the

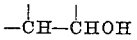

grouping to which these radicals are attached, form a cycloaliphatic ring.

The class of alcohols comprising alkanols containing the grouping

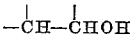

and containing from 3 to 6 carbon atoms is particularly preferred. This class of alkanols of from 3 to 6 carbon atoms is of utility either for the preparation of mercaptans isomeric with the initial alcohol, or of mercaptans of structure corresponding to the initial alcohol. Illustrative of presently useful primary alcohols containing 3 to 6 carbon atoms which are convertible to secondary mercaptans are n-propanol, n-butanol, n-amyl alcohol, isoamyl alcohol, n-hexyl alcohol, and so forth. Primary alcohols of 3 to 6 carbon atoms and convertible to tertiary mercaptans comprise, for example, $$CH_3CHCH_2OH$$
$$|$$
$$CH_3$$

and $$CH_3CH_2CHCH_2OH$$
$$|$$
$$CH_3$$

Presently useful secondary alcohols of from 3 to 6 carbon atoms yielding secondary mercaptans of corresponding structure are exemplified by isopropyl alcohol, sec-butyl alcohol, and cyclohexyl alcohol. Secondary $C_{3-6}$ alcohols convertible to isomeric secondary mercaptans comprise $CH_3CH_2CH_2CHOHCH_3$ and $$CH_3CH(CH_3)CH_2CHOHCH_3$$

Secondary alcohols of 3 to 6 carbon atoms and leading to formation of tertiary mercaptans comprise alcohols wherein the carbinol carbon atom is alpha to a methylidene radical, such as $CH_3CH(CH_3)CHOHCH_3$.

Higher alcohols, containing 7 or more carbon atoms, and containing the grouping

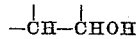

are also susceptible to the process of the invention. The process as described herein may be applied to alcohols containing up to 18 carbon atoms, including both alkanols—branched, straight-chain or cyclic—and aralkanols. Illustrative of primary alcohols of this nature are heptyl alcohol, n-octyl alcohol, 2-ethylhexyl alcohol, 2,4-dimethylhexyl alcohol, n-decyl alcohol, dodecyl alcohol, tridecyl alcohol, tetradecyl acohol, n-hexadecyl alcohol, n-octadecyl alcohol, phenethyl aclohol, 1,2-diphenylethyl alcohol, 2-(4-methyl-2-naphthyl)propyl alcohol, cycylohexylmethanol, 2,5-dimethylcyclohexylmethanol, 3-cyclohexyl-1-propyl alcohol, and so forth. The class of presently useful $C_{7-18}$ secondary alcohols includes, for example, 2-octyl alcohol, 3-octyl alcohol, 3-ethyl-2-hexyl alcohol, 4-nonyl alcohol, 3,5-diethyl-3-pentyl alcohol, 2-decyl alcohol, sec-tetradecyl alcohol, 2-methylcyclohexanol, 2-ethyl-4-propylcyclohexanol, 2-t-butylcyclopentanol, 4-isopropylcycloheptanol, 2-methyl-4-isopropylcyclohexanol, 1-phenyl-2-propyl alcohol, 1,3-diphenyl-2-propyl alcohol, 1-(p-t-butylphenyl)-3-butyl alcohol, 1-p-biphenylyl-3-hexyl alcohol, 2-ethyl-4-p-tolyl-3-pentyl alcohol, and the like.

The catalysts employed in the process of this invention are oxygen acid compounds. By an oxygen acid compound is here meant an oxygen acid or an acidic oxide, that is, an oxide which hydrates to give an acid. Elements the oxides of which are acidic are the non-metallic elements, such as B, Si, S and P; certain metals in particular valence states, such as hexavalent Cr and Mn, form acidic oxides, but characteristically metal oxides hydrate to give amphoteric or basic compounds. To accomplish the process of this invention, highly acidic catalysts are required. The presently preferred catalysts are oxygen acid compounds of non-metallic elements.

For use in the process of the invention, the catalyst will be employed in solid form. To this end, there may be selected a catalytic material solid at the temperatures of operation, or the catalyst may be supported on a solid carrier material. Desirably, the catalyst will be non-volatile at the temperatures used.

A catalyst of choice in the present process is a supported phosphoric acid. The phosphoric acid employed as catalyst may be orthophosphoric acid, a polyphosphoric acid or the like. A particularly advantageous form of catalyst of this nature comprises a phosphoric acid supported on kieselguhr, the catalyst containing over 50%, and generally from about 60% to about 85% by weight phosphoric acid. If desired, instead of phosphoric acid, the catalyst may comprise a phosphoric acid precursor such as a phosphoric oxide which hydrates to a phosphoric acid. Any suitable carrier material may be employed; illustrative of such carrier supports are, for example, kieselguhr, pumice, or like solid substances having a high degree of subdivision or amount of available surface.

Another catalyst possessing particularly high activity in the present process is a promoted silica catalyst. The catalyst is preferably employed in the form of a synthetic precipitated silica gel promoted by minor proportions of an oxide of metal of group IIIB of the periodic system, such as Al, B, and the like. The promoter oxide most desirably comprises aluminum oxide. Such silica catalysts are well known in the petroleum art as cracking and polymerization catalysts. Suitable silica/alumina catalysts are prepared as described, for example, in U.S. 2,142,324 and 2,147,985. We have now found that catalysts of this nature are also effective as catalysts for mercaptan synthesis as described herein.

In general, these catalysts are prepared by first forming a hydrous silica gel or jelly from an alkali silicate and an acid, washing soluble material from the gel, treating or activating the gel with an aqueous solution of a suitable metal salt, and subsequently washing and drying the treated material. The silica hydrogel, after preparation, is partially dried and washed free of excess acid prior to activation by exposure to a solution of any water-soluble, hydrolyzable salt of aluminum, with the sulfate or chloride being preferred; the aluminum is absorbed by the hydrous silica from the salt solution, presumably in the form of a hydrous oxide formed by hydrolysis. The activated catalysts are then rinsed free of the salt solution, and dried at moderate temperatures, producing hard, brittle granules of gel containing negligible quantities of compounds other than silica and the aluminum oxide, together with variant quantities of water. The aluminum oxide is usually present in minor activating quantities of about 1 to about 20 weight percent of the total oxides; still greater amounts, up to about 50 weight percent, may be introduced if desired, although the physical characteristics and activity of the catalyst may, at times, be adversely affected. In order to retain the selectivity of the catalyst for the present reaction, other heavy metal oxides or salts are usually absent from the starting materials and the finished gel.

In general, the present catalysts will be employed in the form of shaped particles of suitable size, confined in a case or bed, or supported in suspension in the reacting stream. Particles ranging from fine powders to relatively coarse granules or pellets may be employed.

The proportion of hydrogen sulfide to alcohol employed in the present process may vary within the range of a molar ratio of from about 1:1 to about 10:1; even higher ratios may be used if desired, although generally a further increase in the proportion of hydrogen sulfide confers no particular benefits and is uneconomic. Molar ratios of hydrogen sulfide to alcohol of about 4:1 to about 8:1 have been found to be advantageous.

The temperature employed in the practice of the process of this invention will generally be at least about 100° C. Temperatures up to about 425° C. are usually satisfactory. The specific temperature most desirable in any case depends on the particular reactant, the rate of flow (space velocity) of the feed, the catalyst chosen, and the superatmospheric pressure used. Overly high temperatures may produce undesirable decomposition of the reaction components, and usually temperatures below about 500° C. will be selected. Part or all of the heat required for conducting the reaction may be supplied by heat furnished to the catalyst chamber. Desirably, the reactants are preheated. Preheating of reactants in the presence of catalyst at an elevated temperature, of from 200° C. to 500° C., may decrease the temperature required for formation of mercaptan when the reactants are contacted, affording beneficial results in prolonging catalyst life and enhancing the purity of the mercaptan product.

The use of superatmospheric pressure is required in the present process. Yields of mercaptan are negligible at atmospheric pressure, and the mechanism by which the present process operates does not appear to take effect except under superatmospheric pressure conditions. A substantial conversion to mercaptan of structure as indicated hereinabove becomes evident above about 50 pounds per square inch gauge (p.s.i.g.), but to obtain the most advantageous results, a pressure of at least about 100 p.s.i.g. is desirable. Excellent results are obtained in the range of from about 100 to 275 p.s.i.g. Pressures up to about 350 p.s.i.g. may be employed if desired, but further increase in pressure approaches the limit of the operational range of ordinary factory equipment without a concomitantly compensating rise in conversion.

The process of this invention is particularly adapted for continuous operation. In carrying out the present process in a continuous manner, the hydrogen sulfide and alcohol are passed under conversion conditions of temperature and pressure through a reaction zone containing the catalyst, fixed in this zone in the form of beds or layers, or suspended as finely divided solid particles in a stream of reagents. In such operation, catalyst may be withdrawn from the reaction zone, continuously or intermittently and replaced or regenerated.

The hydrogen sulfide and alcohol feed may be passed over the catalyst at varying space velocities, depending on the temperature and pressure conditions in any specific case. Space velocity here refers to the ratio of the volume of gas passed through a given volume of catalyst per hour (cc./cc. cat./hr.), the volume of gas being reduced to standard conditions of temperature and pressure (0° C., 1 atm.). Catalyst volume is taken as the gross volume of the catalyst bed. In the instant application, the space velocity of the alcohol reactant alone, which has been found to be an individually controlling factor, is measured and cited. It is an advantage of the process of this invention that the presently preferred catalyst are not greatly sensitive to space velocity, and alcohol velocities ranging up to 500 cc./cc./hr. may be used. In general, however, it is advantageous in the present reaction to employ a space velocity below about 300 cc./cc./hr., and the space velocity will desirably be as low as is consistent with the economic requirements of the process.

By condensation of the effluent from the reaction zone at a controlled temperature, unreacted hydrogen sulfide can readily be separated for recycle and re-use. Any unreacted alcohol will appear in the effluent condensate, together with the sulfur-containing product. As is known in the art, mercaptans and alcohols form azeotropic mixtures which are difficult to separate; and accordingly, at some time in the preparation of mercaptans by the present process, we prefer to subject the reaction mixture to conditions precluding appearance of the alcohol in the effluent. This may be done by ensuring complete reaction of the alcohol with the hydrogen sulfide, or may be accomplished by exposing the alcohol at some stage in the process to elevated temperatures, such as from 200° to 500° C., desirably in the presence of the catalyst. Products resulting from exposure of the alcohol to elevated temperatures in presence of the catalyst may, if desired, be recycled to the process.

The invention is illustrated but not limited by the following examples:

*Example 1*

The apparatus employed was constructed of stainless steel and comprised means for metering the alcohol and hydrogen sulfide into a preheater tube in which the reactants were mixed. The preheater tube led into a heated reactor tube, in which a catalyst bed of ¼ x ¼ inch pellets of phosphoric acid on kieselguhr ("Poly" catalyst No. 1, manufactured by Universal Oil Products) lay across the path of the gaseous reaction mixture. The effluent from the reactor passed through a Dry Ice-acetone cooled condenser and was collected in a chilled receiver.

Using the above-described apparatus, a mixture of hydrogen sulfide and n-propanol in the molar ratio of 6:1 was passed at a n-propanol space velocity of 127 cc./cc./hr., through a catalyst bed at 275° C. under a pressure of 125–140 p.s.i.g. By distillation of the reactor effluent, isopropyl mercaptan, B. 48–55° C., was collected in amount corresponding to 41% conversion of the n-propanol.

By contrast, when n-propanol was passed with hydrogen sulfide over a thoria catalyst, the mercaptan product obtained comprised n-propyl mercaptan, B. 65.5–68.5° C.

Example 2

This example describes the conversion of isopropanol to isopropyl mercaptan.

A mixture of hydrogen sulfide and isopropanol in a molar ratio of 5:1 was passed through a bed of phosphoric acid catalyst as described in Example 1 at an isopropanol space velocity of 152 cc./cc./hr., at 300° C. and under a pressure of 125–140 p.s.i.g. Isopropyl mercaptan was obtained in 37% conversion and yield. At 275° C., the conversion was 38%.

By contrast, when hydrogen sulfide and isopropanol in essentially the same molar ratio were passed under the same conditions over the same catalyst at atmospheric pressure, a conversion of only 1% was obtained.

Example 3

This example illustrates the conversion of sec-butanol to sec-butyl mercaptan.

A mixture of hydrogen sulfide and sec-butanol in a molar ratio of 4:1 was passed at an alcohol space velocity of 6 cc./cc./hr. and under a pressure of about 135 p.s.i.g. over the phosphoric acid on kieselguhr catalyst of Example 1 at 175° C. A 63% conversion to sec-butyl mercaptan was obtained: the crude product contained 85.3% of sec-butyl mercaptan by weight, and simple distillation gave a colorless material containing 97% sec-butyl mercaptan.

The convresion was 45–50% at 200–225° C. and a space velocity of 25–50 cc./cc./hr.

Example 4

In a procedure as described in Examples 1–3, a secondary amyl alcohol was passed, together with hydrogen sulfide in a molar ratio of 6:1, at an alcohol space velocity of about 135 cc./cc./hr., over a supported phosphoric acid catalyst under a pressure of about 135 p.s.i.g. and at a temperature of 275° C. The product comprised secondary amyl mercaptans isomeric with the initial alcohol.

Example 5

This example illustrates conversion of a higher primary alcohol to a mercaptan.

A 4:1 molar mixture of hydrogen sulfide with n-dodecanol was passed over a phosphoric-acid-on-kieselguhr catalyst at about 350° C. under a pressure of about 175 p.s.i.g. Sec-dodecyl mercaptan was isolated from the resulting reaction product.

Example 6

This example illustrates the use of a silica-alumina catalyst in the process of the invention.

A mixture of isopropanol with hydrogen sulfide was passed under the conditions indicated below over ⅛" pellets of 13% alumina on silica (Davison Chemical Co.). Isopropyl mercaptan was obtained in conversions ranging from about 30% to about 50%.

| Temperature, ° C. | Pressure, p.s.i.g. | Alcohol Space Velocity, cc./cc./hr. | H₂S Ratio | Conversion to iPrSH |
|---|---|---|---|---|
| 275 | 135 | 33 | 6:1 | 47 |
| 275 | 135 | 127 | 6:1 | 41 |
| 275 | 135 | 152 | 5:1 | 29 |
| 300 | 135 | 152 | 5:1 | 33 |

By contrast, conversions of less than 5% were obtained when activated alumina was substituted for the present acid oxy catalysts in parallel experiments.

While the invention has been described herein with reference to various particular preferred embodiments thereof, it is to be understood that other modifications not specifically illustrated herein may be used without departure from the spirit and scope of the invention.

What is claimed is:

1. A method for manufacturing mercaptans which comprises the steps of forming a mixture of hydrogen sulfide and an alcohol having from 3 to 18 carbon atoms and having the formula:

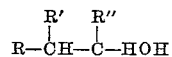

where R, R' and R" are selected from the class consisting of hydrogen and hydrocarbon radicals free of aliphatic unsaturation, the molar ratio of H₂S:alcohol in said mixture being from 1:1 to 10:1, and contacting said mixture at a temperature of from 100° to 425° C. under a super-atmospheric pressure of at least 50 lbs./in.² gage with an acidic catalyst in solid form, said catalyst being an oxygen acid compound of an element selected from the class consisting of B, Si, S and P, said alcohol being free from groups reactive with H₂S under said reaction conditions, and isolating from the resulting reaction product a mercaptan selected from the group consisting of secondary and tertiary mercaptans having the same number of carbon atoms as the starting alcohol.

2. A method in accordance with claim 1 in which said acidic catalyst is a phosphoric acid catalyst on a solid carrier.

3. A method in accordance with claim 1 in which said acidic catalyst is a silica catalyst promoted with alumina.

4. A method in accordance with claim 1 in which said alcohol is a primary alcohol whereby a mercaptan is obtained selected from the class consisting of secondary and tertiary mercaptans by the introduction of the mercaptan group into the molecule on a carbon atom which is alpha to the carbon originally containing the hydroxy group.

5. A method in accordance with claim 1 in which said alcohol is a primary alcohol having two hydrogen atoms on the carbon atom alpha to the carbon atom containing the hydroxy group whereby a secondary mercaptan is obtained by the introduction of the mercaptan group into the molecule on said alpha carbon atom.

6. A method in accordance with claim 1 in which said alcohol is a secondary alcohol.

7. A method for manufacturing mercaptans which comprises the step of forming a mixture of hydrogen sulfide and an alkanol selected from the class consisting of primary and secondary alkanols having from 3 to 18 carbon atoms, the molar ratio of H₂S:alkanol in said mixture being from 1:1 to 10:1, contacting said mixture at a temperature of from 100° C. to 425° C. and under a super-atmospheric pressure of at least 50 lbs./in.² gage with an acidic catalyst in solid form, said catalyst being an oxygen acid compound of an element selected from the class consisting of B, Si, S and P, said alkanol being free from groups reactive with H₂S under said reaction conditions, and isolating from the resulting reaction product a mercaptan selected from the group consisting of secondary and tertiary mercaptans having the same number of carbon atoms as the starting alkanol.

8. A method in accordance with claim 7 in which said alkanol contains from 3 to 6 carbon atoms.

9. A method for manufacturing mercaptans which comprises the steps of forming a mixture of hydrogen sulfide and an alkanol selected from the class consisting of primary and secondary alkanols having from 3 to 18 carbon atoms, the molar ratio of H₂S:alkanol in said mixture being from 1:1 to 10:1, contacting said mixture at a temperature of from 100° C. to 425° C. and under a super-atmospheric pressure of at least 100 lbs./in.² gage with an acidic catalyst in solid form selected from the class consisting of a supported phosphoric acid catalyst and a silica catalyst promoted with alumina, said alkanol being free from groups reactive with H₂S under said reaction conditions, and isolating from the resulting reaction product a mercaptan selected from the group consisting of secondary and tertiary mercaptans having the same number of carbon atoms as the starting alkanol.

10. A method in accordance with claim 9 in which said alcohol is isopropanol whereby isopropyl mercaptan is obtained.

11. A method in accordance with claim 9 in which said alcohol is n-propanol whereby isopropyl mercaptan is obtained.

12. A method in accordance with claim 9 in which said alcohol is secondary butanol whereby secondary butyl mercaptan is obtained.

13. A method in accordance with claim 9 in which said alcohol is secondary amyl alcohol whereby secondary amyl mercaptan is obtained.

References Cited in the file of this patent

UNITED STATES PATENTS 2,816,146    Doumani _____ Dec. 10, 1957

FOREIGN PATENTS 454,668    Great Britain _____ Oct. 6, 1936